April 13, 1965 R. A. KAENEL 3,178,700
ANALOG-TO-DIGITAL CONVERTER
Filed Aug. 22, 1960 5 Sheets-Sheet 1

INVENTOR
R. A. KAENEL
BY Lucian C. Canepa
ATTORNEY

INVENTOR
R. A. KAENEL
BY Lucian C. Canepa
ATTORNEY

April 13, 1965 R. A. KAENEL 3,178,700

ANALOG-TO-DIGITAL CONVERTER

Filed Aug. 22, 1960 5 Sheets-Sheet 3

INVENTOR
R. A. KAENEL
BY Lucian C. Canepa
ATTORNEY

April 13, 1965 R. A. KAENEL 3,178,700

ANALOG-TO-DIGITAL CONVERTER

Filed Aug. 22, 1960 5 Sheets-Sheet 4

INVENTOR
R. A. KAENEL
BY Lucian C. Canepa
ATTORNEY

INVENTOR
R. A. KAENEL
BY Lucian C. Canepa
ATTORNEY

3,178,700
ANALOG-TO-DIGITAL CONVERTER

Reginald A. Kaenel, Murray Hill, N.J., assignor to Bell Telephone Laboratories, Incorporated, New York, N.Y., a corporation of New York Filed Aug. 22, 1960, Ser. No. 51,016
19 Claims. (Cl. 340—347)

This invention relates to the high speed conversion of information, and more particularly to analog-to-digital converters employing negative resistance diodes.

In one well-known type of analog-to-digital converter, the process of converting or encoding an analog sample into an $n$-digit binary code group is carried out sequentially in a digit-by-digit manner, most significant digit first, and requires $n$ digit decisions to completely encode a single analog sample. This type of conversion can be viewed as a geometric progression in which it is first determined in which half of the entire group of possible codes the analog signal sample should be placed; then it is determined in which quarter of the selected half the signal sample should be placed; next, it is determined in which eighth of the selected quarter the signal sample should be placed, and so forth. The process is carried on until the amplitude of the analog signal is specified to the desired degree of fineness. In order to determine the amplitude to one part in 127, in a coder of the type in which the coding steps are linearly related to the amplitude of the analog signal, seven separate digit decisions have to be made. One additional digit decision would, of course, permit determination to one part in 255.

Typically, an $n$-digit analog-to-digital converter of the digit-by-digit decision type operates in a synchronous manner under the control of an external clock or timing source that respectively provides $n$ sequential clock pulses to $n$ different circuit points of the converter. In response to these pulses such a converter sequentially performs and stores the results of $n$ amplitude comparison or digit decision operations.

An object of the present invention is the improvement of information converters, particularly analog-to-digital converters.

Another object of this invention is the provision of digit-by-digit decision type analog-to-digital converters which do not require for their operation complicated external clock or timing sources.

A further object of the present invention is the provision of analog-to-digital converters which are characterized by high speed, low power dissipation, high reliability, and extreme simplicity of design.

These and other objects of the present invention are realized in a specific illustrative analog-to-digital converter embodiment thereof that includes $n$ stages each of which comprises two negative resistance diodes of the voltage-controlled type connected in series-aiding. Connected in series with each pair of diodes is an inductor, and connected to a point between the diodes is an arrangement including a summing amplifier circuit or bipolar source for selectively causing one of the diodes to conduct more current than the other.

The application to the summing amplifier of a reset signal insures that the lower diode of each of the $n$ stages of the illustrative converter is initially in its relatively high voltage stable condition representative, for example, of a "0" signal. Then, an analog signal to be converted is applied to the summing amplifier, causing current flow in a given direction to the point between the series-aiding diodes, and a trigger or convert pulse is applied to a point between the series-aiding diodes and the inductor of the first or most significant digit stage of the converter to cause the lower diode to switch to the relatively low voltage positive resistance region of the voltage-current characteristic curve thereof. This switching action causes a binary-weighted current to be applied to the input circuit of the summing amplifier. Assuming that this binary-weighted current is less than the current derived from the input analog signal, the output of the summing amplifier is such as to cause the current flow to the point between the series-aiding diodes to continue in the given direction. Consequently, to indicate that the digital code representation of the analog signal should include a "1" signal in the most significant digit place thereof, the series-aiding diode configuration switches to a new operating condition, in which the upper diode assumes a stable point on the relatively high voltage positive resistance region of its characteristic curve and the lower diode stabilizes at a point on the relatively low voltage positive resistance region of its characteristic curve.

Thus, for the considered case in which the binary-weighted current from the first or most significant stage is less than the current derived from the input analog signal, the lower diode of the first stage is caused to switch to and remain in its relatively low voltage stable condition representative of a "1" signal, which condition causes the continued application of the binary-weighted output current to the input circuit of the summing amplifier.

If, on the other hand, the switching of the lower diode of the first stage to the relatively low voltage positive resistance region of its characteristic curve causes a binary-weighted current of a magnitude greater than the current derived from the input analog signal to be applied to the input circuit of the summing amplifier, the summing amplifier is cut off and an auxiliary power source connected to the output electrode thereof causes the current flow to the point between the series-aiding diodes to reverse in direction. Consequently, to indicate that the digital code representation of the analog signal should not include a "1" signal in the most significant digit place thereof, the series-aiding diode configuration switches back to its initial operating condition, in which the upper diode returns to a stable point on the relatively low voltage positive resistance region of its characteristic curve and the lower diode stabilizes at a point on the relatively high voltage positive resistance region of its characteristic curve, which latter point is representative of a "0" signal and corresponds to a voltage that causes the application of the binary-weighted current from the first stage to the input circuit of the summing amplifier to be discontinued.

The switching of the series-aiding diodes of the first stage in response to the application thereto of a trigger or convert pulse causes a regenerated pulse, i.e., an amplified pulse of a predetermined time duration, to appear across the inductor connected in series with the series-aiding diodes. The leading edge of this regenerated pulse coincides with the leading edge of the trigger pulse, the trailing edge of the regenerated pulse occurring at a precisely determinable and controllable later time which is a function of the parameters of the first stage.

Coupled to the inductor of the first stage is a circuit that responds to the trailing edge of the regenerated pulse to supply a trigger pulse to a point between the inductor and the series-aiding diodes of the second stage, thereby to cause the diodes thereof to undergo a switching cycle of the type specified above in connection with the description of the first stage. The binary-weighted current contributed by the second stage to the input circuit of the summing amplifier adds to the current contributed thereto by the first stage, which, as specified above, may be either a binary-weighted current value, indicative of a "1" signal in the most significant digit place, or a zero current value, indicative of a "0" signal in the most significant digit place.

In a similar manner, each stage of the specific analog-to-digital converter described herein responds to an applied trigger pulse by performing an amplitude comparison, storing the result of the comparison, and then supplying an exactly-timed pulse for initiating a similar cycle of operation in a next or less significant digit stage.

Thus, an illustrative analog-to-digital converter made in accordance with the principles of the present invention includes a plurality of highly reliable and simple stages each of which possesses amplitude discriminating, memory, and timing capabilities.

It is a feature of the present invention that an analog-to-digital converter include *n* stages each comprising two negative resistance diodes of the voltage-controlled type connected in series-opposition.

It is another feature of this invention that an analog-to-digital converter include *n* stages each of which includes two series-aiding negative resistance diodes of the voltage-controlled type to the midpoint of which is connected a bipolar source whose output current controls the mode of switching of the diodes in response to an applied trigger pulse.

It is still another feature of the present invention that an analog-to-digital converter include *n* stages each comprising two series-aiding negative resistance diodes of the voltage-controlled type connected in series with an inductor, and a bipolar source connected to the midpoint of the diodes for controlling the mode of switching thereof in response to an applied trigger pulse, the switching of the diodes causing a regenerated timing pulse to appear across the inductor.

A complete understanding of the present invention and of the above and other features and advantages thereof may be gained from a consideration of the following detailed description of an illustrative embodiment thereof presented hereinbelow in connection with the accompanying drawing, in which.

Figure 1A:
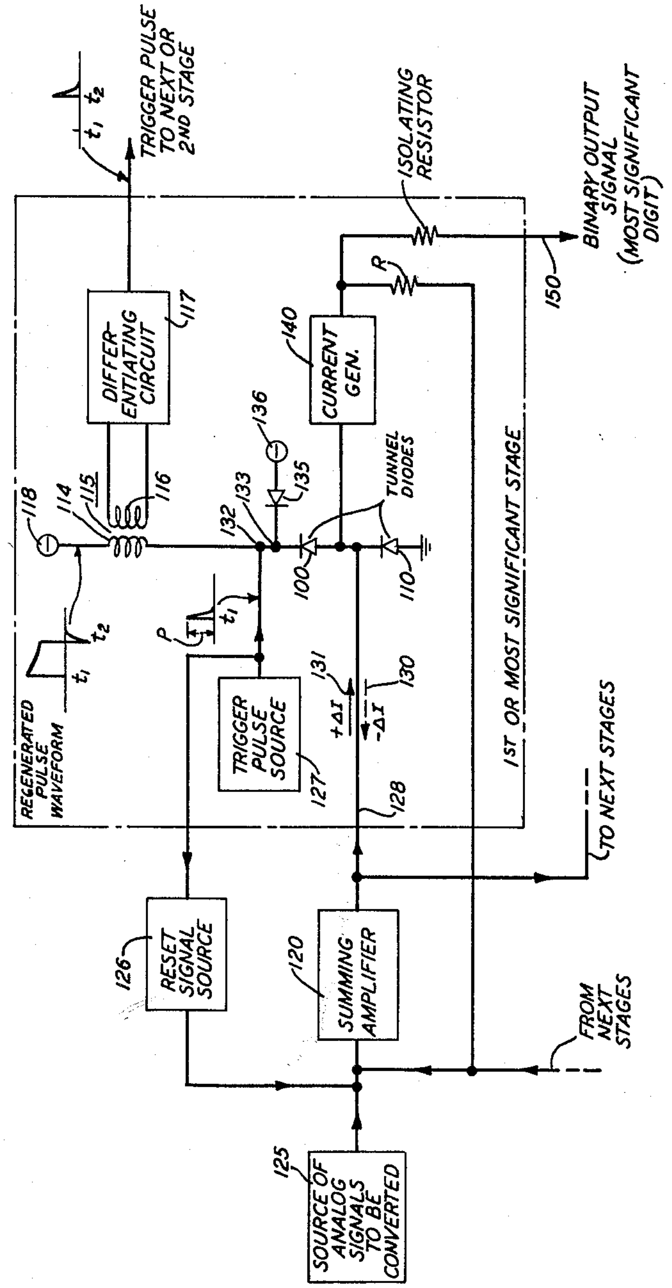
FIG. 1A depicts one stage of an analog-to-digital converter which illustratively embodies the principles of the present invention.
Figure 1B:
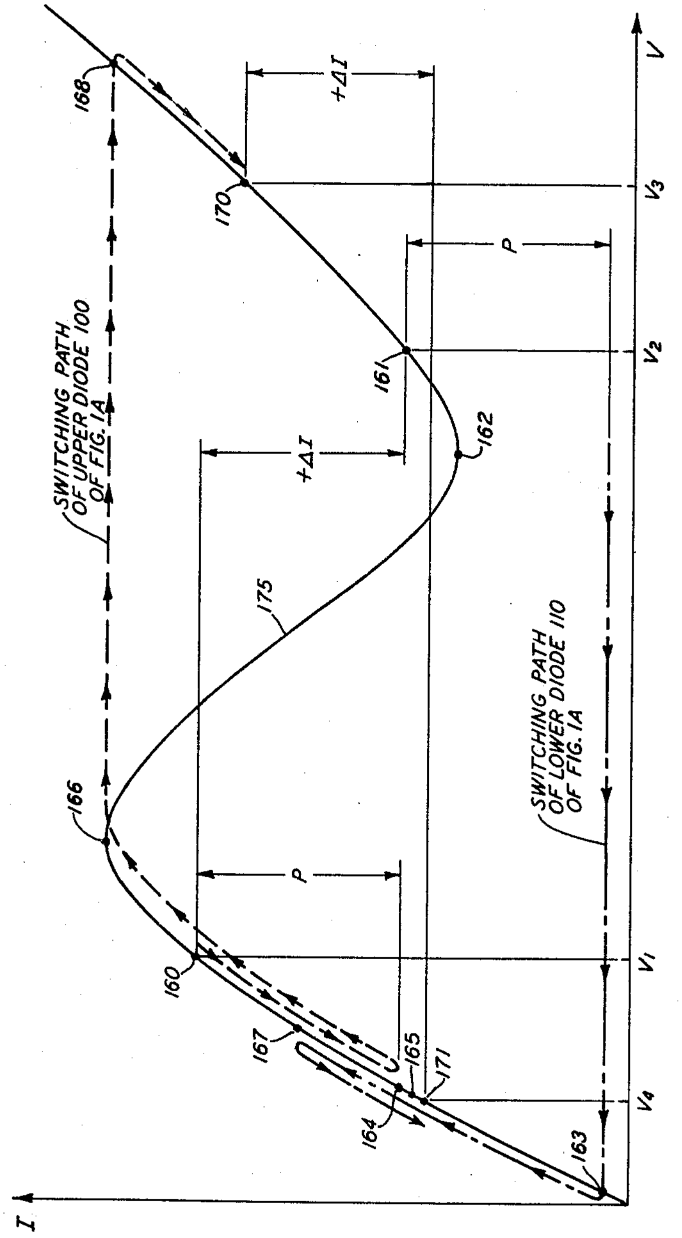
FIG. 1B illustrates the voltage-current characteristic curve of each of the series-aiding diodes shown in FIG. 1A and, further, indicates one type of switching action that takes place in the embodiment of FIG. 1A in response to an applied trigger pulse.
Figure 1C:
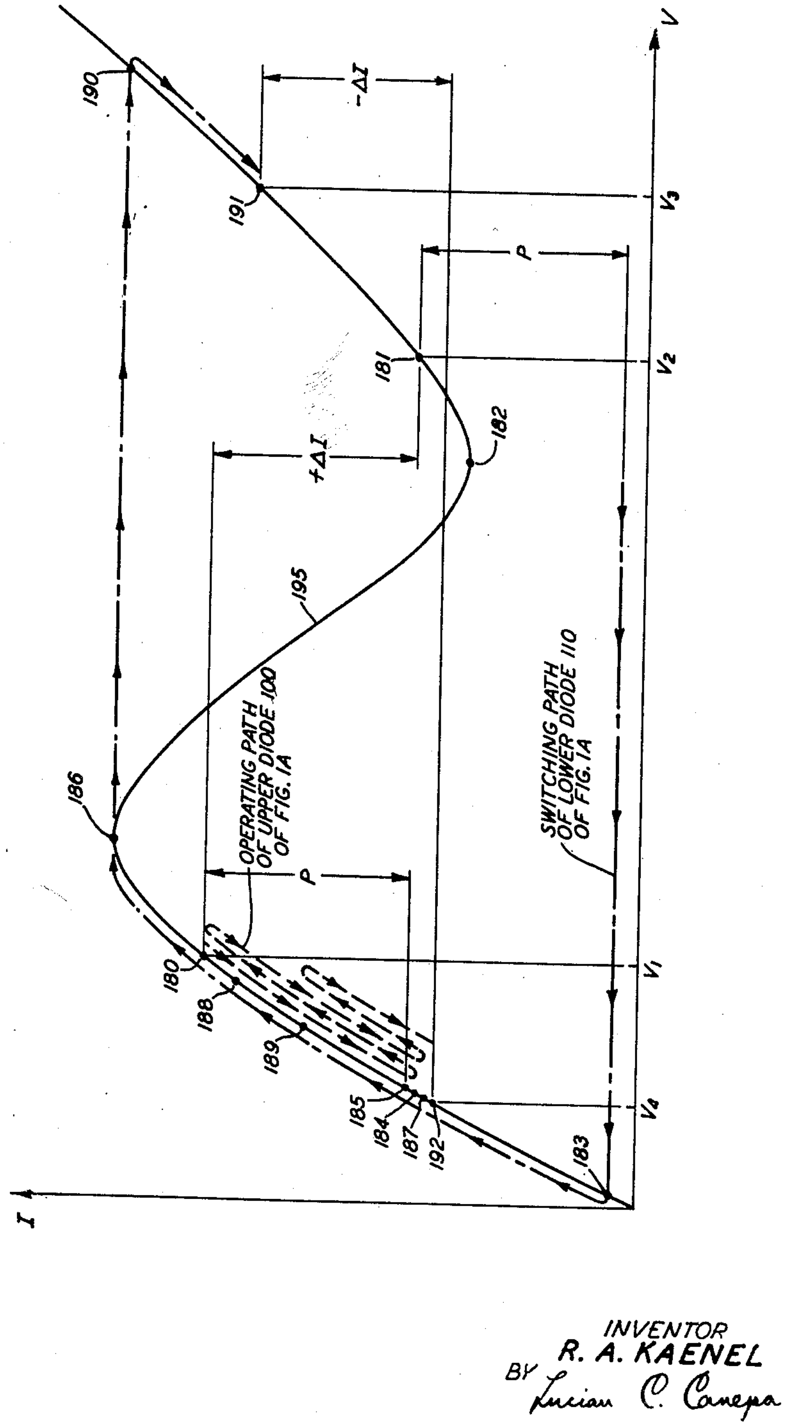
Figure 2A:
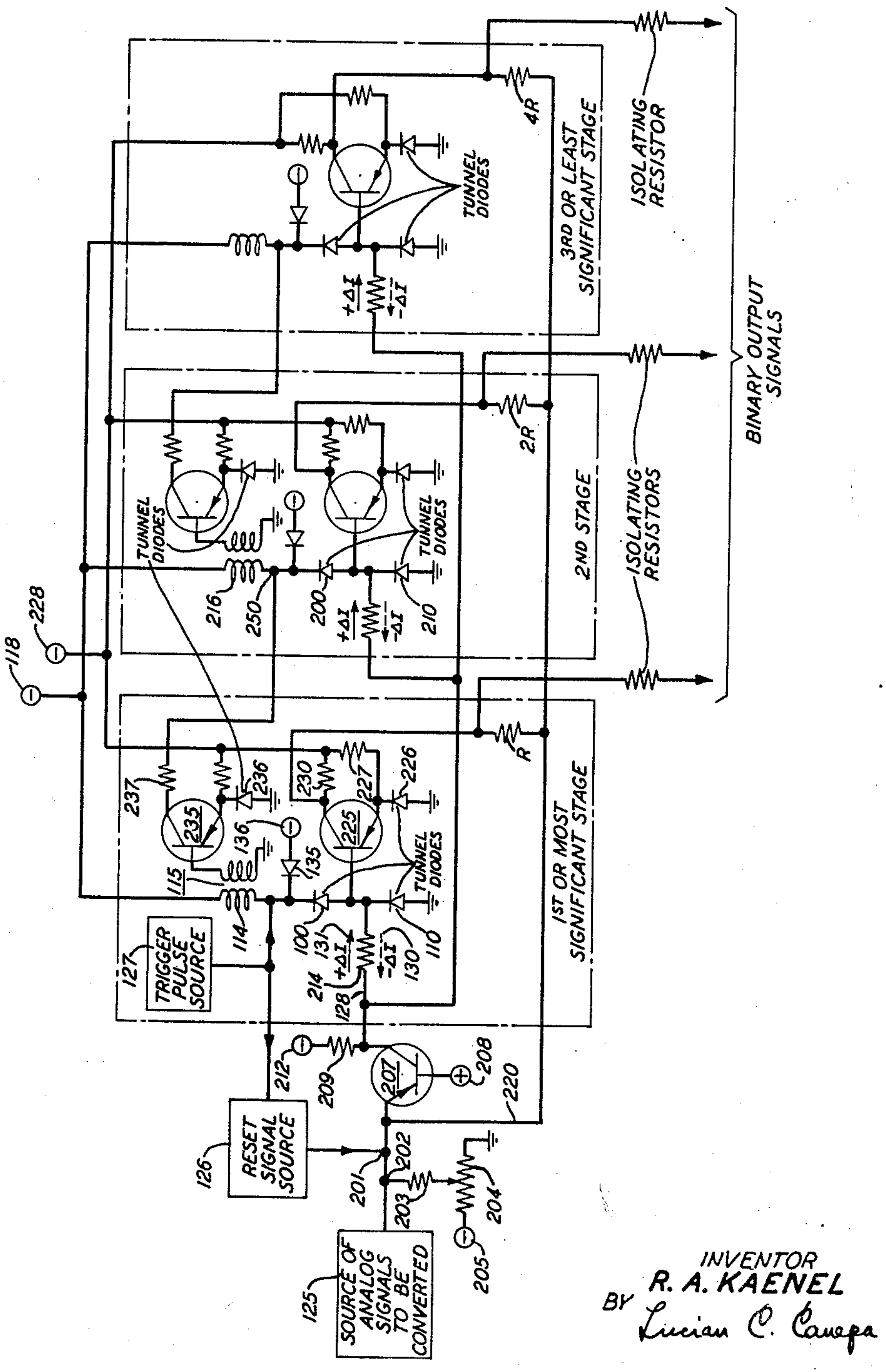
Figure 2B:
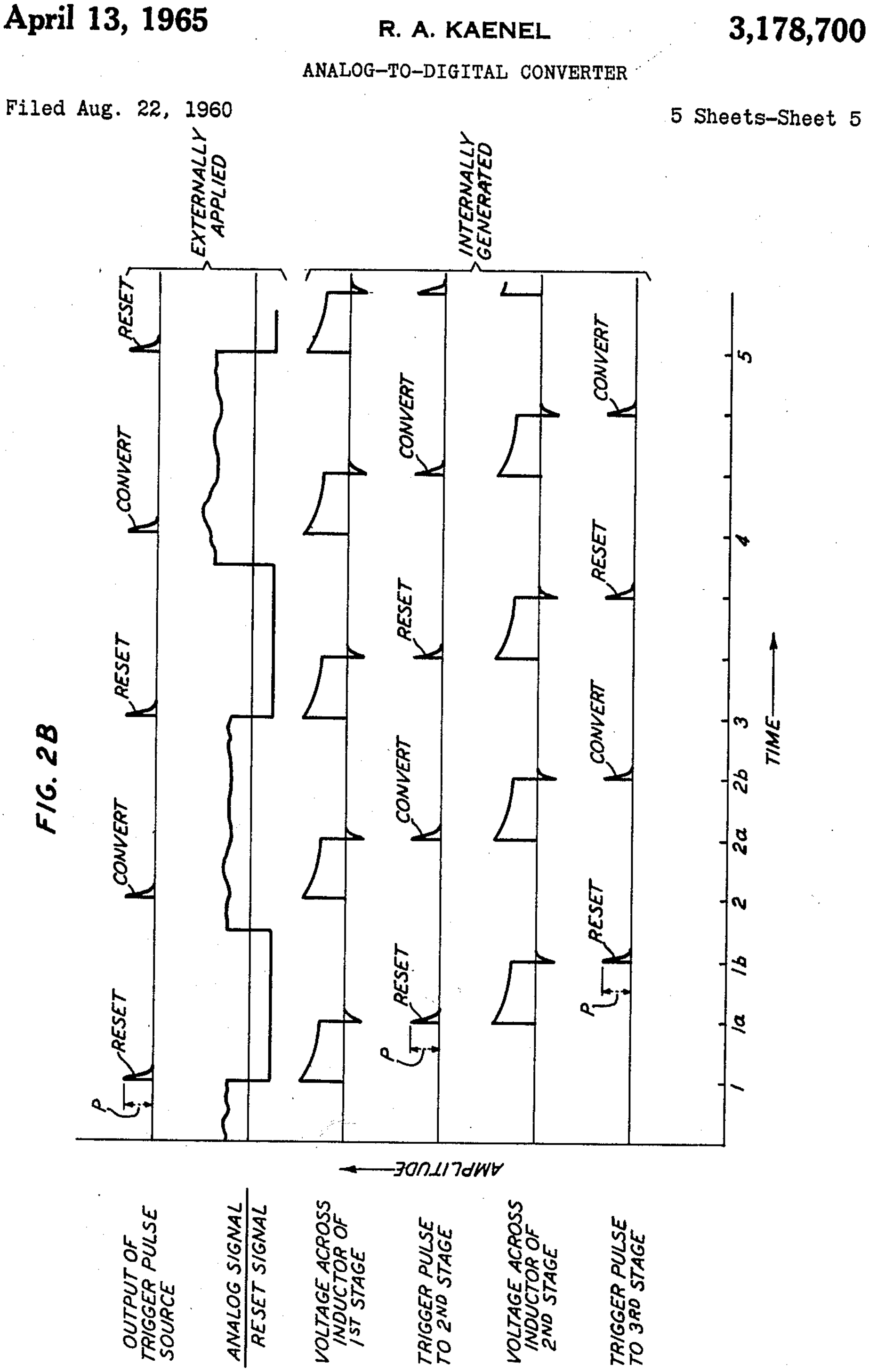

FIG. 1C also illustrates the voltage-current characteristic curve of each of the series-aiding diodes shown in FIG. 1A and, further, indicates another type of switching action that takes place in the embodiment of FIG. 1A in response to an applied trigger pulse;

FIG. 2A is a detailed showing of a three-stage analog-to-digital converter which illustratively embodies the principles of this invention; and FIG. 2B depicts various waveforms characteristic of the converter shown in FIG. 2A.

A great variety of electronic devices and circuits exhibit negative resistance characteristic and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P–N Junctions," L. Esaki, Physical Review, Volume 109, January-March 1958, pages 603–604, "Tunnel Diodes as High-Frequency Devices," H. S. Sommers, Jr., Proceedings of the Institute of Radio Engineers, Volume 47, July 1959, pages 1201–1206, and "High-Frequency Negative-Resistance Circuit Principles for Esaki Diode Applications," M.E. Hines, The Bell System Technical Journal, Volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction; that it be narrow (the chemical transition from *n*-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Referring now to FIG. 1A, there is shown in simplified form an illustrative one-stage analog-to-digital converter made in accordance with the principles of the present invention. The converter includes two negative resistance diodes 100 and 110 of the voltage-controlled type connected in series-aiding. Connected in series with the diodes 100 and 110 is an inductor 114 which may, advantageously, be the primary winding of a transformer 115 whose secondary winding 116 is connected to a differentiating circuit 117. Further, the inductor 114 is connected to a direct-current source 118 which is selected to be of a value that allows only one diode at a time to be maintained at a stable point on the relatively high voltage positive resistance region of the characteristic curve thereof, the other diode being maintained at a stable operating point on the relatively low voltage positive resistance region of its characteristic curve.

In FIG. 1A, analog signals to be converted or encoded into a binary code group are coupled to the input circuit of a summing amplifier or bipolar source 120 from a signal source 125. Also coupled to the input circuit of the summing amplifier 120 is the output of a reset signal source 126 whose input is derived from a trigger pulse source 127. The source 126 responds to alternate ones of the pulse outputs of the source 127 to supply a negative input voltage to the input circuit of the summing amplifier 120, thereby to cause the current in amplifier output lead 128 to flow in the direction indicated by dashed arrow 130, which requires that the current flow through the bottom diode 110 exceed in value the current that flows through the upper diode 100. The diodes 100 and 110 then respond to a reset pulse from the source 127 to switch to a condition in which the lower diode 110 comes to rest at a relatively high voltage stable point and the upper diode 100 comes to rest at a relatively low voltage stable point. The subsequent application to the summing amplifier 120 of an analog signal to be converted causes the current in the output lead 128 of the amplifier to flow in the direction indicated by solid arrow 131, thereby to cause the stable operating point of the lower diode 110 to shift to a high voltage-low current point and the stable operating point of the upper diode 100 to shift to a low voltage-high current point.

Then, the application of a convert trigger pulse from the source 127 to a point 132 between the inductor 114 and the upper diode 100 initiates a switching cycle which causes current generator 140 to supply a current through a binary-weighted resistor R to the input circuit of the summing amplifier 120. If this current contribution from the generator 140 exceeds in value the current supplied to the input circuit of the summing amplifier by the analog signal from the source 125, the direction of current flow in the output lead 128 of the amplifier 120 reverses to assume the direction indicated by the dashed arrow 130. As a result, at the completion of the aforementioned switching cycle, and as will be described hereinbelow in detail in connection with FIG. 1C, the lower diode 110 returns to a stable operating point on the relatively high voltage positive resistance region of its characteristic curve and the upper diode 100 returns to a stable operating point on the relatively low voltage positive resistance region of its characteristic curve. Accordingly, the current generator 140 is turned off, no current flows through the binary-weighted resistor R, and the resultant digital output signal on the lead 150 from the first or most significant digit stage is a relatively low voltage or "0" signal, thereby indicating that the proper encoding of the assumed analog signal requires a "0" signal in the most significant digit place of the binary code group which is to represent the analog signal.

If, on the other hand, the current contributed from the generator 140 does not exceed in value the current supplied to the summing amplifier input circuit by the analog signal, the direction of current flow in the amplifier output lead 128 remains as indicated by the solid arrow 131. As a result, at the completion of the aforementioned switching cycle, and as will be described hereinbelow in detail in connection with FIG. 1B, the lower diode 110 comes to rest at a stable operating point on the relatively low voltage positive resistance region of its characteristic curve and the upper diode 100 comes to rest at a stable operating point on the relatively high voltage positive resistance region of its characteristic curve. Accordingly, the current generator is maintained on, current flows through the binary-weighted resistor R, and the resultant digital output signal on the lead 150 from the first or most significant digit stage is a relatively high voltage or "1" signal, thereby indicating that the proper encoding of the assumed analog signal requires a "1" signal in the most significant digit place of the binary code group which is to represent the analog signal.

As a result of either one of the two types of switching cycles described herein, there appears across the inductor 114 of the first stage a regenerated pulse whose leading edge occurs at time $t_1$ (see regenerated pulse waveform in FIG. 1A) in coincidence with the leading edge of an output pulse from the source 127, and whose trailing edge occurs at a later time $t_2$, the time interval between $t_1$ and $t_2$ being exactly determinable and controllable, being dependent on the parameters of the first stage, and being the time in which the first stage performs its amplitude comparison function.

The differentiating circuit 117 of the first stage responds to the application thereto of the regenerated pulse by supplying at time $t_2$ to a second or less significant stage a trigger or internal timing pulse to initiate therein another amplitude comparison or digit decision operation and, further, to cause the second stage to furnish a regenerated pulse from which a timing pulse for the third stage is derived, and so forth, until each of the stages has responded to provide either a "0" or a "1" output signal. These output signals form a binary code group representative of the input analog signal.

The principles of the present invention will be better understood if the switching action of the series-aiding diodes 100 and 110 of FIG. 1A is described in detail. For this purpose, the graphical depictions of FIGS. 1B and 1C are helpful.

Referring first to FIG. 1B, there are shown the initial stable operating points 160 and 161 of the diodes 100 and 110, respectively, of FIG. 1A. To conform with the assumption that the initial application of an analog signal to the input circuit of the summing amplifier 120 causes a current to flow in the amplifier output lead 128 in the direction of the solid arrow 131, the current corresponding to the operating point 160 is indicated in FIG. 1B as being greater by an amount $+\Delta I$ than the value of the current corresponding to the operating point 161.

The subsequent application from the source 127 of FIG. 1A to the point 132 of a positive current convert pulse causes a current decrement of amplitude P to flow through each of the diodes 100 and 110. This causes the operating point of the lower diode 110 to switch at time $t_1$ from the point 161 past the valley point 162 on the characteristic curve 175 of FIG. 1B to a point 163 on the relatively low voltage positive resistance region of the curve. During this same time interval, the current flowing through the upper diode 100 also decreases by the value P, as represented by a shift in the operating point of the diode 100 from the point 160 to a lower current point 164. Then, as the input convert pulse from the source 127 decreases to a zero value, the operating point of the lower diode 110 shifts to a point 165 whose current value is the same as that which corresponds to the initial operating point 161, while the operating point of the upper diode 100 shifts back to its initial operating point 160, the currents corresponding to the points 160 and 165 differing by $+\Delta I$. Next, as the magnetic field about the inductor 114 collapses, the points 160 and 165 charge upward on the relatively low voltage positive resistance region of the characteristic curve 175 toward the peak point 166 thereof. In so doing, the current difference $+\Delta I$ is maintained, which, in other terms, means that FIG. 1B depicts the switching cycle that results when the current contribution through the binary-weighted resistor R of FIG. 1A to the input circuit of the summing amplifier 120 is less than the current contributed thereto by the analog signal to be converted.

When the operating point of the upper diode 100 of FIG. 1A reaches the peak point 166 of the characteristic curve 175 shown in FIG. 1B, the operating point of the lower diode 110 reaches a point 167. The upper diode then at time $t_2$ switches to a point 168 on the relatively high voltage positive resistance region of the curve 175 and, as the magnetic field about the inductor 114 collapses, charges downward toward the valley point 162, and the operating point of the lower diode 110 then charges downward on the relatively low voltage positive resistance region of the curve 175 so as to maintain the difference $+\Delta I$ between the current values flowing through the two series-aiding diodes. Finally, the upper diode 100 comes to rest at a relatively high voltage point 170 and the lower diode 110 comes to rest at a relatively low voltage point 171 whose corresponding voltage value $V_4$ maintains the current generator 140 of FIG. 1A turned on, thereby causing a "1" signal to appear across the binary-weighted resistor. Note that the current values corresponding to the points 170 and 171 differ by the amount $+\Delta I$ and that the sum of the voltages $V_3$ and $V_4$ corresponding to the points 170 and 171 is equal to the sum of the voltages $V_1$ and $V_2$ which are the voltage values of the initial operating points 160 and 161, respectively.

If, as a result of a digit decision or amplitude comparison operation in a stage other than the most significant digit one, the output current of the summing amplifier 120 of FIG. 1A should be caused to flow in the direction of the dashed arrow 130, thereby necessitating that the difference between the currents through the diodes 100 and 110 be $-\Delta I$, the operating point 170 of the upper diode 100 shifts downward to the point 161 of FIG. 1B and the operating point 171 of the lower diode 110 shifts upward to the point 160, in which case the lower diode is still at a relatively low voltage $V_1$ which is sufficient to maintain the current generator 140 in its "on" condition. Thus, it is evident that switching actions in other stages cannot destroy the stored state of an already switched stage.

Referring now to FIG. 1C, there is depicted the switching cycle which results when a stage or combination of stages contribute to the input circuit of the summing amplifier 120 of FIG. 1A a current whose value is greater than the value contributed thereto by the analog signal to be converted. Such a current relationship necessitates that the current flow in the output lead of the summing amplifier be in the direction of the dashed arrow 130 of FIG. 1A.

Specifically, points 180 and 181 on the characteristic curve 195 shown in FIG. 1C represent the initial operating points of the diodes 100 and 110, respectively, of FIG. 1A in the presence of an applied analog signal and just prior to the application of a convert pulse from the source 127. The points 180 and 181 correspond exactly to the points 160 and 161, respectively, of FIG. 1B. Thus, the current values corresponding to the points 180 and 181 differ by an amount $+\Delta I$ and the voltage values corresponding thereto are $V_1$ and $V_2$, respectively.

The application from the source 127 to the point 132 of FIG. 1A of a positive convert pulse causes a current decrement of amplitude P to flow through each of the diodes 100 and 110. This causes the operating point of the lower diode 110 to switch from the point 181 past the valley point 182 of the characteristic curve 195 to a point 183 on the relatively low voltage positive resistance region of the curve 195. During this same time interval, the current flow through the upper diode 100 also decreases by the value P, as represented by a shift in the operating point of the diode 100 from the point 180 to a lower current point 184. Subsequently, as the convert pulse decreases to a zero value, the operating point of the lower diode 110 shifts to a point 185 whose current value is the same as that corresponding to the initial operating point 181 and the operating point of the upper diode 100 shifts back from the point 184 to the initial operating point 180, the current difference between the points 180 and 185 having the value $+\Delta I$. Then, as the magnetic field about the inductor 114 begins to collapse, there is a tendency for the points 180 and 185 to charge upward on the relatively low voltage positive resistance region of the curve 195 toward the peak point 186 thereof. In so doing, however, and due to the fact that it has been hypothesized for the switching action depicted in FIG. 1C that the current contributed through the binary-weighted resistor R of FIG. 1A to the input circuit of the summing amplifier 120 is greater than the current contributed thereto by the analog signal, which in turn necessitates that the direction of current flow in the amplifier output lead 128 switch from the direction indicated by the solid arrow 131 to the direction indicated by the dashed arrow 130, the current difference $+\Delta I$ decreases to zero and then changes to the value $-\Delta I$. In other words, the operating point 180 of the upper diode 100 shifts to a point 187 while the operating point of the lower diode 110 shifts to a point 188 whose corresponding current value is greater by an amount $\Delta I$ than the current value which corresponds to the point 187. Then, the operating point 188 of the lower diode 110 charges upward to the peak point 186 and switches to a point 190 on the relatively high voltage positive resistance region of the curve 195, while the operating point 187 of the upper diode 100 charges upward to a point 189. Subsequently, as the magnetic field about the inductor 114 collapses, the operating point of the lower diode 110 charges downward from the point 190 toward the valley point 182, and the operating point of the upper diode 100 charges downward from the point 189 on the relatively low voltage positive resistance region so as to maintain the difference $-\Delta I$ between the current values flowing through the two series-aiding diodes. Finally, the lower diode 110 comes to rest at a relatively high voltage point 191 whose corresponding voltage value $V_3$ turns off the current generator 140 of FIG. 1A, thereby causing a "0" signal to appear across the binary-weighted resistor R, and the upper diode 100 comes to rest at a relatively low voltage point 192. Note that the current values corresponding to the points 191 and 192 differ by the amount $-\Delta I$ and that the sum of the voltages $V_3$ and $V_4$ corresponding to the points 191 and 192 is equal to the sum of the voltages $V_1$ and $V_2$ which are the voltage values of the initial operating points 180 and 181, respectively.

At the completion of a complete conversion or encoding cycle, it is necessary to reset the stages of the illustrative analog-to-digital converter described herein to their "0" states, i.e., reset the lower diode of each stage to its reatively high voltage stable state. This is done under the control of a positive reset pulse from the source 127. The pulse is applied to the point 132 of the first stage and is also applied to the reset signal source 126 to cause it to couple a negative signal to the input circuit of the summing amplifier 120 to cause the direction of current flow in the output lead 128 thereof to be in the direction of the dashed arrow 130. This combination, i.e., a reset current pulse to the point 132 and a current flow from the midpoint of the diodes in the direction of the arrow 130, causes the diodes 100 and 110 to assume the initial operating points 160 and 161, respectively, of FIG. 1B, or 180 and 181, respectively, of FIG. 1C, thereby readying the diodes for conversion of another applied analog signal upon the receipt of a subsequent pulse from the source 127.

More specifically, if at the completion of a conversion cycle the operating points of the diodes 100 and 110 of FIG. 1A are at the points 170 and 171, respectively, as shown in FIG. 1B, a current flow in the amplifier output lead 128 in the direction of the dashed arrow 130 causes the point 170 to shift to the point 161 and the point 171 to shift to the point 160. The positive reset pulse then initiates a switching cycle which causes the lower diode to come to rest at the point 170 and the upper diode 100 to come to rest at the point 171. Subsequently, upon application of an analog signal to the input circuit of the summing amplifier 120, the operating point of the lower diode 110 shifts from the point 170 to the initial operating point 161 and the operating point of the upper diode 100 shifts from the point 171 to the initial operating point 160.

If, however, at the completion of a conversion cycle, the operating points of the diodes 100 and 110 of FIG. 1A are at the points 192 and 191, respectively, as shown in FIG. 1C, a current flow in the amplifier output lead 128 in the direction of the dashed arrow 130 simply causes these operating points to be maintained, since the current difference therebetween is already $-\Delta I$. The positive reset pulse then initiates a switching cycle which causes the operating point of the lower diode 110 to come to rest again at the point 191 and the operating point of the upper diode 100 to come to rest again at the point 192. Subsequently, upon application of an analog signal to the input circuit of the summing amplifier 120, which causes the current in the amplifier output lead 128 to assume the direction indicated by the arrow 131, the operating point of the lower diode 110 shifts from the point 191 to the initial operating point 181 and the operating point of the upper diode 100 shifts from the point 192 to the initial operating point 180.

Referring back again to FIG. 1A, there is shown connected to a point 133 between the inductor 114 and the series-aiding diodes 100 and 110 an asymmetrically-conducting diode element 135 in series with a negative direct-current bias source 136. The element 135 in combination with the source 136 serves to limit the voltage which may appear across the series-aiding diodes 100 and 110, thereby insuring that the diodes respond in a highly reliable manner to applied pulses to provide the desired switching actions described herein.

More specifically, when the negative voltage between the point 133 and ground of FIG. 1A exceeds the voltage of the source 136, the diode 135 conducts and provides in shunt with the diodes 100 and 110 a low impedance path to ground, the value of the source 136 being selected such that trigger or transient pulses cannot possibly drive both of the diodes 100 and 110 at the same time to operating points on the relatively high voltage positive resistance regions of their characteristic curves. If both diodes were so driven, the highly reliable and systematic switching actions described herein would be inhibited and, as a result, an analog signal might be converted into a binary code group not representative thereof.

Referring now to FIG. 2A, there is depicted in detail a three-stage analog-to-digital converter which illustratively embodies the principles of the present invention. The trigger pulse source 127 of the converter may be a conventional pulse generator and the reset signal source 126 thereof may be a relaxation oscillator of a type which responds to alternate ones of the output pulses of the source 127 to cause the reset source 126 to clamp the point 201 at a negative potential with respect to ground.

Analog signals to be encoded by the converter shown in FIG. 2A are coupled from the source 125 to a node point 202 to which is connected one end of a resistor 203 whose other or lower end is adjustably connected to a resistor 204 across which a negative direct-current bias source 205 is connected. The polarity of input analog signals to be encoded is such as to tend to drive the point 202 positive with respect to ground, the point 202 not, however, actually becoming positive until the negative threshold bias established between the lower end of the resistor 203 and ground is overcome.

The node point 202 is connected to the emitter electrode of a summing amplifier which comprises a p-n-p transistor 207 whose base electrode is connected to a positive direct-current bias source 208 and whose collector electrode is connected through a resistor 209 to a negative direct-current bias source 212. Until the emitter or input electrode of the transistor 207 becomes positive with respect to the base electrode thereof, the transistor remains cut off and current flow in the amplifier output lead 128 is through resistors 214 and 209 to the source 212 in the direction indicated by the dashed arrow 130, which has the designation $-\Delta I$ adjacent thereto. When, however, current flows down from the node point 202 through the resistor 203 to cause the node point to exceed the positive potential of the base electrode of the transistor 207, the transistor is turned on and current flows in the lead 128 through the resistor 214 in the direction of the solid arrow 131, which is marked $+\Delta I$.

Also coupled to the node point 202, and therefore also contributive to the determination of the voltage condition of the emitter electrode of the transistor 207 of FIG. 2A, is a lead 220 which extends through an appropriately weighted reistor to the current generator of each of the stages of the illustrative analog-to-digital converter described herein. Thus, for example, when the current generator of the first or most significant digit stage is turned on, the output of the generator thereof flows through the binary-weighted resistor R through the lead 220 from the input circuit of the transistor 207, thereby tending ot drive the point 202 negative with respect to ground.

The current generator of the first stage includes a p-n-p transistor 225 whose base electrode is connected to the midpoint of the two series-aiding negative resistance diodes 100 and 110, whose emitter electrode is connected both to the cathode of a negative resistance diode 226 which acts as a voltage source and through a resistor 227 to a negative direct-current bias source 228, and whose collector electrode is connected both to the binary-weighted resistor R and through a resistor 230 to the source 228.

When the lower diode 110 is in its relatively high voltage stable state, the midpoint of the diodes 100 and 110 is relatively negative with respect to the emitter electrode of the transistor 225 and, as a result, the transistor 225 is turned on, thereby providing a low impedance path to ground which prevents any current derived from the source 228 from flowing through the binary-weighted resistor R from the input circuit of the summing transistor 207. However, when the lower diode 110 is switched to its relatively low voltage stable state, the midpoint of the diodes 100 and 110 becomes relatively positive with respect to the emitter electrode of the transistor 225 and, consequently, the transistor is turned off, the drop across the emitter diode 226 then acting as a voltage source that insures that the transistor 225 is positively cut off. Under such conditions, current flows through the resistor R and the lead 220 from the node point 202 of the input circuit of the summing transistor 207, at which point 202 the summing or comparison of the current derived from the analog signal and that contributed by the current generator of the first stage occurs. In turn, as previously explained, the result of this comparison determines the operating condition of the summing transistor 207.

As discussed in detail above in connection with the description of FIGS. 1B and 1C, each switching cycle of the diodes 100 and 110 causes a regenerated pulse to appear across the primary winding 114 of the transformer 115. As shown in FIG. 2A, the regenerated pulse is coupled to the base electrode of a differentiating p-n-p transistor amplifier 235.

This regenerated pulse includes a substantial positive excursion and a small negative portion. The transistor amplifier 235, which is biased to cut off by the source 228 and a negative resistance diode 236, remains cut off during the positive excursion of the regenerated pulse, but, during the negative portion thereof, couples a positive current increment through a resistor 237 to a point 250 between an inductor 216 and two series-aiding negative resistance diodes 200 and 210 of the second stage, thereby triggering a comparison or digit decision operation in the second stage.

The second and third stages of the converter shown in FIG. 2A operate in the same manner as and are similar in configuration to the first stage, whose mode of operation and circuit arrangement have been completely described hereinabove. Although only three stages are depicted in FIG. 2A, it is to be clearly understood that in accordance with the principles set forth herein an *n* stage analog-to-digital converter may be constructed.

The waveforms shown in FIG. 2B are helpful in summarizing the over-all operation of the illustrative converter depicted in FIG. 2A. At each of the odd-numbered instances 1, 3, and 5 marked on the time scale of FIG. 2B, the source 127 supplies a pulse, designated a reset pulse, to the series-aiding diodes 100 and 110 of the first stage and further, causes the reset signal source 126 to clamp the point 201 of the input circuit of the summing amplifier at a negative potential, thereby insuring that a current $-\Delta I$ flows from the midpoint of the series-aiding diodes of each stage. The reset pulse is applied to the first stage at time 1 and initiates in the illustrative converter the internal generation of sequentially-occurring reset pulses which are applied to the second and third stages of FIG. 2A at times 1*a* and 1*b*, respectively.

Then, at the time marked 2 on the time scale of FIG. 2B, the source 127 supplies to the first stage of FIG. 2A a second pulse, termed a convert pulse, and, at the same time, the output of the reset signal source 126 goes to zero, thereby allowing the voltage at the point 201 to be solely determined by the analog signal to be converted. This second or convert pulse initiates in the illustrative converter the internal generation of sequentially-occurring convert pulses which are applied to the second and third stage of FIG. 2A at times 2*a* and 2*b*, respectively.

It is noted that my copending application Serial No. 51,017, filed August 22, 1960, now Patent No. 3,021,517, issued Feb. 13, 1962 is directed to subject matter which is related to the analog-to-digital converter disclosed herein.

It is emphasized that although particular attention herein has been directed to the use of tunnel diodes as the series-aiding elements of each converter stage, other two-terminal voltage-controlled negative resistance arrangements having characteristics of the type shown in FIGS. 1B and 1C may also be used therefor.

Furthermore, it is to be understood that the above-described arrangements are only illustrative of the application of the principles of the present invention. Numerous other arrangements may be devised by those skilled in the art without departing from the spirit and scope of this invention. For example, although the description above has specified transformer coupling between adjacent ones of the illustrative converter stages, capacitive or other coupling techniques may also be used therebetween. Additionally, suitable alternative differentiating, current generating, and summing amplifier circuits may be readily devised by one skilled in the art for inclusion in a converter embodying the principles of this invention. Moreover, although the cathode element of the upper one of the series-aiding negative resistance diodes of each stage has been described and depicted as being directly connected to the inductor in series therewith, it is to be understood that the plate element of the upper one of two series-aiding diodes may be instead directly connected to the series inductor, in which case the polarities of the various bias sources and control pulses associated with each stage are respectively reversed so as to insure that the more accurate of the two discriminating diode current extremes, namely, the peak current extreme, is utilized during the regenerative switching cycle of each stage.

What is claimed is:

1. In combination in a system for converting an analog signal into an $n$-digit binary representation thereof, $n$ stages arranged in a linear array, a first set of $n$ negative resistance voltage-controlled diodes respectively associated with said $n$ stages, a second set of $n$ negative resistance voltage-controlled diodes respectively associated with said $n$ stages, the pair of diodes associated with each stage being connected in series-aiding, an inductor connected in series with each pair of series-aiding diodes, first source means connected to said diodes for biasing one of each pair to the relatively high voltage positive resistance region of its voltage-current characteristic curve to a point at which a predetermined value of current flows therethrough and for biasing the other one of each pair to the relatively low voltage positive resistance region of its voltage-current characteristic curve to a point at which the same predetermined value of current flows therethrough, and second source means connected to the midpoint of each pair of diodes for causing the current flow through each of the diodes of said first set to be different from the current flow through each of the diodes of said second set.

2. A combination as in claim 1 wherein said second source means includes summing amplifier means.

3. A combination as in claim 2 further including current generating means connected between the midpoint of each pair of diodes and the input to said summing amplifier means.

4. A combination as in claim 3 further including pulse means for switching the diodes of the first one of said $n$ stages to initiate a digit decision operation in the first stage and to cause a regenerated pulse to appear across the inductor thereof.

5. A combination as in claim 4 still further including means responsive to the trailing edge of the regenerated pulse which appears across the inductor of the first stage for initiating the sequential switching of the pairs of diodes of the other stages of said linear array.

6. A combination as in claim 5 further including means for limiting the total possible voltage excursion across the series-aiding diodes of each stage to insure the reliable switching of each stage in response to an applied switching pulse.

7. A combination as in claim 6 wherein said limiting means includes a series arrangement connected in parallel with the series-aiding diodes of each stage, said series arrangement comprising an asymmetrically-conducting diode element and a bias source.

8. In combination in a system for converting an analog signal to an $n$-digit binary representation thereof, a binary-weighted stage having first and second stable operating conditions, means for setting said stage to its first operating condition, timing pulse means for switching said stage to its second operating condition thereby to provide a signal representative of the binary weight of said stage and a control signal having a predetermined time duration, means for comparing the analog signal to be converted with the binary-weighted signal from said stage and for switching said stage back to its first operating condition if said binary-weighted signal is greater than said analog signal, and means responsive to the trailing edge of said control signal for supplying a timing pulse to a succeeding stage of said system.

9. A combination as in claim 8 wherein said stage includes two negative resistance voltage-controlled diodes connected in series-aiding and an inductor connected in series with said diodes.

10. A combination as in claim 9 further including voltage limiting means connected in parallel with said series-aiding diodes to insure the reliable switching thereof.

11. A combination as in claim 10 wherein said comparing means is connected to the midpoint of said series-aiding diodes and controls the direction of current flow to said midpoint.

12. In combination in a system for converting an analog signal into an $n$-digit binary representation thereof, $n$ stages each including two negative resistance diodes of the voltage-controlled type connected in series-aiding and an inductor connected in series with said diodes, means for biasing one of the diodes of each of said stages to the relatively high voltage positive resistance region of its voltage-current characteristic curve and for biasing the other one of the diodes of each of said stages to the relatively low voltage positive resistance region of its voltage-current characteristic curve, and summing amplifier means directly connected to the midpoint of the diodes of each of said stages for selectively passing through one of the diodes of each stage a greater current than through the other.

13. In combination in an analog-to-digital converter, two tunnel diodes connected in series-aiding, an inductor connected in series with said diodes, control current means and binary-weighted current generating means each connected to the midpoint of said diodes, means for biasing one of said diodes to a stable operating point on the relatively high voltage positive resistance region of its voltage-current characteristic curve and for biasing the other one of said diodes to a stable operating point on the relatively low voltage positive resistance region of its voltage-current characteristic curve, and means for causing said one diode to switch to the relatively low voltage positive resistance region of its characteristic curve to thereby turn on said current generating means and to initiate a regenerative switching cycle, the direction of current flow at the output of said control current means respectively determining whether said current generating means is maintained on or turned off at the completion of said switching cycle.

14. In combination, two negative resistance voltage-controlled diodes connected in series-aiding, inductance means connected in series with said diodes, and bipolar source means connected in parallel with one of said diodes.

15. A combination as in claim 14 wherein said bipolar source means includes summing amplifier means having an input circuit and an output circuit.

16. A combination as in claim 15 further including analog signal source means connected to the input circuit of said summing amplifier means, and binary-weighted current generating means connected between the midpoint of said series-aiding diodes and the input circuit of said summing amplifier means, the sum of the currents contributed to said input circuit by said current generating means and said analog signal source means being determinative of the direction of current flow in the output circuit of said summing amplifier means.

17. A combination as in claim 14 wherein said series-aiding diodes are characterized by two stable operating conditions, said combination further including means for biasing said diodes to one of said stable operating conditions, in which condition one of said series-aiding diodes is biased to a point on the relatively high voltage positive resistance region of its voltage-current characteristic curve and the other one of said diodes is biased to a point on the relatively low voltage positive resistance region of its voltage-current characteristic curve.

18. A combination as in claim 17 further including pulse means for switching the one diode to a point on the relatively low voltage positive resistance region of its characteristic curve, thereby initiating a switching cycle which provides a regenerated pulse across said inductance means.

19. In combination in an analog-to-digital converter stage, two negative resistance diodes of the voltage-controlled type connected in series-aiding, an inductor connected in series with said diodes, and summing amplifier means directly connected to the midpoint of said diodes.

References Cited by the Examiner

UNITED STATES PATENTS

| | | | |
|---|---|---|---|
| 2,666,816 | 1/54 | Hunter. | |
| 2,840,806 | 6/58 | Bateman | 340—347 |
| 2,851,614 | 9/58 | Emanuelsson | 307—88.5 |
| 2,997,604 | 8/61 | Shockley | 307—88.5 |
| 3,021,517 | 2/62 | Kaenel | 307—88.5 |
| 3,027,464 | 3/62 | Kosonocky | 307—88.5 |
| 3,069,564 | 12/62 | Lange | 307—88.5 |

OTHER REFERENCES

Maguire: "Computers Head for 1,000-Mc Operation," Electronics, Jan. 29, 1960, pages 55–59, page 56 relied on.

Sferrino: "Transistor Circuit Techniques for a Core Memory with 500 Millimicrosecond Cycle Time," I.R.E. Wescon Convention Recod, 1959, part 4, pp. 1–15, page 10 relied on.

MALCOLM A. MORRISON, *Primary Examiner.*

I. L. SRAGOW, *Examiner.*